United States Patent
Miyashita et al.

(10) Patent No.: US 9,080,013 B2
(45) Date of Patent: Jul. 14, 2015

(54) PRODUCTION METHOD FOR ALIPHATIC POLYESTER

(71) Applicant: Kureha Corporation, Tokyo (JP)

(72) Inventors: Tatsuaki Miyashita, Tokyo (JP);
Fuminori Kobayashi, Tokyo (JP);
Hiroyuki Sato, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 0 days.

(21) Appl. No.: 14/304,221

(22) Filed: Jun. 13, 2014

(65) Prior Publication Data

US 2015/0025216 A1     Jan. 22, 2015

(30) Foreign Application Priority Data

Jul. 22, 2013   (JP) ................. 2013-151493

(51) Int. Cl.
    *C08G 63/78*          (2006.01)
    *C08G 63/87*          (2006.01)
    *C08G 63/85*          (2006.01)
    *C08G 67/04*          (2006.01)

(52) U.S. Cl.
CPC ............... *C08G 63/87* (2013.01); *C08G 63/85* (2013.01)

(58) Field of Classification Search
CPC ............................. C08G 63/78; C08G 63/183
USPC ........................ 528/271, 272, 288, 290, 293
See application file for complete search history.

(56) References Cited

U.S. PATENT DOCUMENTS

| | | | |
|---|---|---|---|
| 2,668,162 A | 2/1954 | Lowe | |
| 5,310,599 A | 5/1994 | Ford | |
| 5,830,991 A | 11/1998 | Shiiki et al. | |
| 7,465,779 B2 * | 12/2008 | Kenmoku et al. | 528/290 |
| 2003/0125431 A1 | 7/2003 | Yamane et al. | |
| 2003/0125508 A1 | 7/2003 | Yamane et al. | |
| 2003/0191326 A1 | 10/2003 | Yamane et al. | |
| 2005/0169817 A1 | 8/2005 | Matsuo et al. | |
| 2007/0073032 A1 | 3/2007 | Sato et al. | |
| 2010/0234557 A1 | 9/2010 | Sato et al. | |

FOREIGN PATENT DOCUMENTS

| | | |
|---|---|---|
| JP | H07-126358 A | 5/1995 |
| JP | H09-328481 A | 12/1997 |
| JP | H10-60101 A | 3/1998 |
| JP | H10-168171 A | 6/1998 |
| JP | H11-349670 A | 12/1999 |
| JP | 2000119269 A | 4/2000 |
| JP | 3164456 B | 5/2001 |
| JP | 2005220203 A | 8/2005 |
| JP | 2010-077350 A | 4/2010 |
| WO | 0214303 A1 | 2/2002 |
| WO | 03037956 A1 | 5/2003 |
| WO | 2005035623 A1 | 4/2005 |
| WO | 2007086563 A1 | 8/2007 |

OTHER PUBLICATIONS

Kowalski et al., "Kinetics and mechanism of cyclic esters polymerization initiated with tin(II) octoate, 1", Macromol. Rapid Commun. 19, No. 11, Dec. 16, 1998, pp. 567-572.

Degee et al., "New catalysis for fast bulk ring-opening polymerization of lactide monomers", Macromol. Symp. Oct. 1, 1999, 144, pp. 289-302.

Chujo et al., "Ring-Opening Polymerization of Glycolide", Die Makromolekulare Chemie, 100 (Jan. 13, 1967), pp. 262-266.

* cited by examiner

*Primary Examiner* — Terressa Boykin
(74) *Attorney, Agent, or Firm* — Oliff PLC

(57) ABSTRACT

A method to efficiently produce an aliphatic polyester and to improve the thermal stability of the resulting aliphatic polyester. A sulfonic acid compound is used as a co-catalyst at the time of a ring-opening bulk polymerization of a cyclic ester using a tin compound catalyst.

8 Claims, No Drawings

PRODUCTION METHOD FOR ALIPHATIC POLYESTER

CROSS-REFERENCE TO RELATED APPLICATIONS

This application claims the benefit of Japanese Patent Application No. 2013-151493 filed Jul. 22, 2013, the disclosure of which is herein incorporated by reference in its entirety.

TECHNICAL FIELD

The present invention relates to a method for efficiently producing an aliphatic polyester with improved thermal stability using ring-opening polymerization of a cyclic ester such as a glycolide.

BACKGROUND OF THE INVENTION

Aliphatic polyesters such as polyglycolic acid or polylactic acid are decomposed by water, microorganisms, or enzymes present in the natural world such as the ground or the sea and have therefore attracted attention as biodegradable polymer materials with a small environmental burden. In addition, since these aliphatic polyesters have biodegradable absorbent properties, they are also used as polymer materials for medical purposes such as surgical sutures or artificial skin. Among aliphatic polyesters, polyglycolic acid (hereafter called "PGA") has a high melting point and can be melt-molded, and applications are therefore being developed for this substance alone or in conjugation with other resin materials or the like.

An aliphatic polyester can be synthesized by dehydrative polycondensation of α-hydroxycarboxylic acid with glycolic acid, lactic acid, or the like, for example, but it is difficult to produce a high-molecular-weight aliphatic polyester with this method. In contrast, in order to efficiently produce a high-molecular-weight aliphatic polyester, a method of synthesizing a dimeric cyclic ester of α-hydroxycarboxylic acid and subjecting the cyclic ester to ring-opening polymerization is employed. For example, when a glycolide, which is a dimeric cyclic ester of glycolic acid, is subjected to ring-opening polymerization, polyglycolic acid is obtained. When a lactide, which is a dimeric cyclic ester of lactic acid, is subjected to ring-opening polymerization, polylactic acid is obtained. An aliphatic polyester may also be obtained by the ring-opening polymerization of a lactone.

Known production methods for aliphatic polyesters using ring-opening polymerization of these cyclic esters include, for example, those described in Patent Documents 1 to 6 below. In addition, the present inventors have also proposed a production method for an aliphatic polyester using the ring-opening polymerization of a cyclic ester, wherein a partial polymer in a solid pulverized state is continuously obtained by continuously introducing a molten product of a partial polymer into a twin-screw stirring apparatus, further subjecting the product to solid phase polymerization, and then pelletizing the produced polymer by melting and kneading the polymer together with a thermal stabilizer (Patent Document 7).

In these production methods for aliphatic polyesters using the ring-opening polymerization of cyclic esters, an initiator (molecular weight modifier) such as an alcohol is used. A compound such as an oxide, a halogenide, a carboxylate, or an alkoxide of a metal such as tin (Sn), titanium (Ti), aluminum (Al), antimony (Sb), germanium (Ge), zirconium (Zr), or zinc (Zn), for example, is used as a ring-opening polymerization catalyst. Of these, tin compounds are preferably used since the catalytic activity of tin compounds is relatively higher than that of other metal compounds.

However, the improvement of the polymerization rate directly leads to the improvement of the productivity of the aliphatic polyester, so there are great expectations for further increases in the polymerization rate. One possible means for increasing the polymerization rate is an increase in the polymerization temperature, but increasing the polymerization rate by simply increasing the polymerization temperature induces a decrease in the equilibrium reaction rate based on the equalization of the polymerization rate and the depolymerization rate, which is not preferable. In addition, the problem of the discoloration of the produced polymer also occurs. One way to avoid such problems would be to improve the polymerization rate by using a co-catalyst. In addition, in the ring-opening polymerization using a metal compound catalyst, a tendency is discovered that the metal which remains in the produced polyester decreases the thermal stability of the polyester, promoting depolymerization and thermolysis of the polyester. Accordingly, it would be extremely desirable to find a co-catalyst that improves or does not decrease thermal stability in the ring-opening polymerization of a cyclic ester. However, practically no co-catalysts effective for the ring-opening polymerization of cyclic esters have yet been discovered.

For example, Patent Document 8 discloses the direct polymerization of lactic acid with a combination of a tin catalyst and an organic acid as a co-catalyst and describes that a polylactic acid with excellent thermal stability has been efficiently obtained as a result. However, it has been reported that the addition of an organic acid (octanoic acid) in ring-opening polymerization acts as a retardant in the production of a polylactic acid by ring-opening polymerization of a lactide (cyclic dimer of a lactic acid) using a tin compound catalyst (Non-Patent Document 1). On the other hand, in Non-Patent Document 2 and Patent Document 9, it is described that, in the ring-opening polymerization of a lactide or lactone using a tin compound catalyst, a Lewis base compound such as triphenylphosphine acts as a co-catalyst and leads to a reduction in polymerization time and an improvement in the thermal stability of the produced polyester. However, according to the research of the present inventors, the co-catalytic action of Lewis base compounds is not yet satisfactory.

CITATION LIST

Patent Literature

Patent Document 1: Japanese Unexamined Patent Application Publication No. H07-126358A
Patent Document 2: Japanese Unexamined Patent Application Publication No. H10-060101A
Patent Document 3: Japanese Unexamined Patent Application Publication No. 2005-220203A
Patent Document 4: WO/2005/035623A
Patent Document 5: Japanese Unexamined Patent Application Publication No. H11-349670A
Patent Document 6: Japanese Unexamined Patent Application Publication No. H10-168171A
Patent Document 7: WO/2007/086563A
Patent Document 8: Japanese Unexamined Patent Application Publication No. 2010-077350A
Patent Document 9: Japanese Patent No. 3164456

Non-Patent Document

Non-Patent Document 1: Macromol. Rapid Commun., 1998, 19, pp. 567-572

Non-Patent Document 2: Macromol. Symp. 1999, 144, pp. 289-302

SUMMARY OF INVENTION

Problem to be Solved by the Invention

In light of the circumstances described above, a main object of the present invention is to provide an efficient production method for an aliphatic polyester by finding a co-catalyst effective for the ring-opening polymerization of a cyclic ester.

Another object of the present invention is to provide a production method for an aliphatic polyester capable of effectively suppressing decreases in the thermal stability of the produced aliphatic polyester due to a residual metal catalyst.

Solution to Problem

According to the research of the present inventors, in order to achieve the objects described above, it was discovered that it is effective to use a sulfonic acid compound as a co-catalyst in combination with a tin compound catalyst. The production method for an aliphatic polyester according to the present invention is based on the knowledge described above. More specifically, the production method comprises subjecting a cyclic ester to ring-opening polymerization in the presence of a tin compound serving as a catalyst, a polymerization initiator, and a sulfonic acid compound serving as a co-catalyst.

DETAILED DESCRIPTION (Cyclic Ester)

Dimeric cyclic esters and lactones of α-hydroxycarboxylic acid are preferable as cyclic esters used in the present invention. Examples of α-hydroxycarboxylic acids for forming dimeric cyclic esters include glycolic acid, L- and/or D-lactic acid, α-hydroxybutyric acid, α-hydroxybutyric acid, α-hydroxyvaleric acid, α-hydroxycaproic acid, α-hydroxyisocaproic acid, α-hydroxyheptanoic acid, α-hydroxyoctanoic acid, α-hydroxydecanoic acid, α-hydroxymyristic acid, α-hydroxystearic acid, alkyl-substituted products thereof, and the like.

Examples of lactones include β-propiolactone, β-butyrolactone, pivalolactone, γ-butyrolactone, δ-valerolactone, β-methyl-δ-valerolactone, ε-caprolactone, and the like. Examples of cyclic ether esters include dioxanone and the like.

When the cyclic ester contains asymmetric carbon, it may be in the D-form, L-form, or racemic form. These cyclic esters may be respectively used alone or as a combination of two or more types of esters. Any aliphatic copolyester can be obtained by using two or more types of cyclic esters. The cyclic ester may be copolymerized with other copolymerizable comonomers as necessary. Examples of other comonomers include cyclic monomers such as trimethylene carbonate and 1,3-dioxolane, and the like.

Of these cyclic esters, glycolides, which are dimeric cyclic esters of glycolic acid, and L- and/or D-lactides, which are dimeric cyclic esters of L- and/or D-lactic acids, and mixtures thereof are preferable, and glycolides are more preferable. Glycolides may be used alone, but they may also be used in combination with other cyclic monomers to produce a polyglycolic acid copolymer (copolyester). When producing a polyglycolic acid copolymer, the proportion of glycolides in the copolymer is preferably at least 70 wt %, more preferably at least 80 wt. %, and particularly preferably at least 90 wt. % from the perspective of physical properties such as the crystallinity or gas barrier properties of the produced copolyester. In addition, lactide, ε-caprolactone, and trimethylene carbonate are preferable as cyclic monomers to be copolymerized with glycolides.

The production method for the cyclic ester is not particularly limited. For example, a glycolide can be obtained with a method of depolymerizing a glycolic acid oligomer. As a method of depolymerizing a glycolic acid oligomer, it is possible to employ, for example, the melt &polymerization method described in the specification of U.S. Pat. No. 2,668,162, the solid phase depolymerization method described in Japanese Unexamined Patent Application Publication No. 2000-119269, the solution phase depolymerization method described in Japanese Unexamined Patent Application Publication No. H9-328481 or WO 02/14303A1, or the like. The glycolide obtained as a cyclic condensate of chloroacetate reported in Die Makromolekulare Chemie, 100 (1967), 262-266 by K. Chujo et al. can also be used.

Of the depolymerization methods described above, a solution phase depolymerization method is preferable for obtaining a glycolide. In a solution phase depolymerization method, (1) a mixture containing a glycolic acid oligomer and at least one type of a high-boiling-point polar organic solvent having a boiling point in a range of 230 to 450° C. is heated to a temperature at which the depolymerization of the oligomer occurs at normal pressure or reduced pressure; (2) the oligomer is dissolved in the solvent until the residual ratio (volume ratio) of the melt phase of the oligomer reaches 0.5 or lower; (3) the oligomer is depolymerized while further heating at the same temperature; (4) the produced dimeric cyclic ester (that is, the glycolide) is distilled together with the high-boiling-point polar organic solvent; and (5) the glycolide is recovered from the distillate.

Examples of high-boiling-point polar organic solvents include phthalic acid bis-(alkoxy alkyl esters) such as di-(2-methoxyethyl)phthalate, alkylene glycol dibenzoates such as diethylene glycol dibenzoate, aromatic carboxylic acid esters such as benzyl butyl phthalate or dibutyl phthalate, aromatic phosphates such as tricresyl phosphate, polyalkylene glycol ethers such as polyethylene dialkyl ether, and the like, and the solvent is typically used at a ratio of 0.3 to 50 times the volume (weight ratio) of the oligomer. Tetraethylene glycol, polyethylene glycol, polypropylene glycol, or the like may also be used as necessary as a solubilizing agent for the oligomer together with the high-boiling-point polar organic solvent. The depolymerization temperature of the glycolic acid oligomer is ordinarily at least 230° C. and preferably from 230 to 320° C. Depolymerization is performed at normal pressure or reduced pressure, but it is preferable to perform depolymerization while heating at a reduced pressure of 0.1 to 90.0 kPa (1 to 900 mbar).

<Production of an Aliphatic Polyester>

In the method of the present invention, an aliphatic polyester is produced by subjecting the cyclic ester described above to ring-opening bulk polymerization in the presence of a tin compound catalyst, an initiator (molecular weight modifier), and a sulfonic acid compound as a co-catalyst.

(Catalyst)

In the present invention, among the metal compounds widely used conventionally as ring-opening polymerization catalysts for cyclic esters, a tin compound is used due to its excellent polymerization activity, safety, solubility in monomers, and the like. Examples of tin compounds include tin halides such as tin dichloride and tin tetrachloride; tin salt of organic acid such as tin octanoate and tin acetate; and alkoxy tin compounds such as ethoxy tin and butoxy tin; and the like.

Of these, tin halides such as tin dichloride and tin tetrachloride and tin salt of organic acid such as tin octanoate and tin acetate are preferable from the perspectives of activity and solubility in monomers, and in particular, tin dichloride or a hydrate thereof is most preferably used. If necessary, a substance in which part of divalent tin is transformed to the tetravalent state by oxidation or the like may also be preferably used.

The tin compound catalyst is typically used at a ratio of 300 ppm or less, preferably 1 to 100 ppm, and more preferably 10 to 60 ppm on the basis of weight with respect to the cyclic ester, excluding hydrated water. When the amount is too small, the polymerization rate decreases even if a co-catalyst is added, and when the amount is too large, the thermal stability of the produced polyester is decreased.

(Initiator)

As an initiator (molecular weight adjusting agent), water or a monohydric alcohol such as butanol or dodecyl alcohol (lauryl alcohol) is used, and a higher monohydric alcohol or a polyhydric alcohol such as ethylene glycol, diethylene glycol, butanediol, hexanediol, or glycerin is preferably used.

In addition to an initiator effect, these initiator compounds have an effect of adjusting (reducing) the molecular weight of the produced aliphatic polyester and are typically used at a quantity ratio selected from the range of 0.1 to 0.5 mol % and preferably 0.15 to 0.3 mol % on a molar basis with respect to the cyclic ester in accordance with the desired molecular weight of the produced polyester.

(Sulfonic Acid Compound)

In the present invention, a sulfonic acid compound is used as a co-catalyst in combination with the tin compound catalyst. Examples of sulfonic acid compounds include aromatic sulfonic acids such as benzene sulfonic acid, n-butylbenzene sulfonic acid, n-octylbenzene sulfonic acid, n-dodecylbenzene sulfonic acid, pentadecylbenzene sulfonic acid, 2,5-dimethylbenzene sulfonic acid, 2,5-dibutylbenzene sulfonic acid, o-aminobenzene sulfonic acid, m-aminobenzene sulfonic acid, p-aminobenzene sulfonic acid, 3-amino-4-hydroxybenzene sulfonic acid, 5-amino-2-methylbenzene sulfonic acid, 3,5-diamino-2,4,6-trimethylbenzene sulfonic acid, 2,4-dinitrobenzene sulfonic acid, p-chlorobenzene sulfonic acid, 2,5-dichlorobenzene sulfonic acid, cumene sulfonic acid, xylene sulfonic acid, o-cresol sulfonic acid, m-cresol sulfonic acid, p-cresol sulfonic acid, p-toluene sulfonic acid, 2-naphthalene sulfonic acid, 1-naphthalene sulfonic acid, isopropyl naphthalene sulfonic acid, dodecylnaphthalene sulfonic acid, dinonyl naphthalene sulfonic acid, dinonyl naphthalene disulfonic acid, 1,5-naphthalene disulfonic acid, 2,7-naphthalene disulfonic acid, 4,4-biphenyl disulfonic acid, anthraquinone-2-sulfonic acid, m-benzene disulfonic acid, 2,5-diamino-1,3-benzene disulfonic acid, aniline-2,4-disulfonic acid, anthraquinone-1,5-disulfonic acid, and polystyrene sulfonic acid; aliphatic sulfonic acids such as methane sulfonic acid, ethane sulfonic acid, 1-propane sulfonic acid, n-octyl sulfonic acid, pentadecyl sulfonic acid, trifluoromethane sulfonic acid, trichloromethanesulfonic acid, 1,2-ethane disulfonic acid, and 1,3-propane disulfonic acid; alicyclic sulfonic acids such as cyclopentane sulfonic acid, cyclohexane sulfonic acid, and camphor sulfonic acid; and the like. Of these, aromatic sulfonic acids such as p-toluene sulfonic acid and aliphatic sulfonic acids such as methane sulfonic acid and ethane sulfonic acid are preferably used due to advantages such as activity and thermal stability.

These sulfonic acid compounds are preferably used at a ratio of 0.1 to 3 mol and particularly preferably at a ratio of 0.5 to 2 mol per 1 mol of the tin compound catalyst. When the added amount is too small, the co-catalyst effect is poor, and when the added amount is increased beyond 3 mol, the acid concentration in the polymerization system increases and, as observed in Non-Patent Document 1, induces a decrease in the polymerization rate due to the acid, which is not preferable.

(Other Auxiliary Agents)

The tin compound catalyst, polymerization initiator, and sulfonic acid compound described above may be respectively added to the polymerization system alone, but in order to promote uniform dispersion in the polymerization system, it is preferable to add the components to the polymerization system after diluting the components in advance with an appropriate organic solvent having lytic potential with respect to the catalyst, in particular. The ring-opening polymerization of the cyclic ester in the present invention can be adopted for either a batch system or a continuous system, but in the case of a continuous system, it is preferable to add a diluting liquid using an organic solvent, in particular. An organic solvent having a boiling point of at least 50° C. is preferable so that the solvent does not cause changes in the concentration of the catalyst due to volatilization during storage or when supplied to the polymerization apparatus. Examples of such an organic solvent include ester solvents such as methyl acetate (boiling point: 56.9° C.) and ethyl acetate (boiling point: 77° C.); ether solvents such as dioxane (boiling point: 101.1° C.); ketone solvents such as acetone (boiling point: 56.5° C.) and methyl ethyl ketone (boiling point: 79.5° C.); and the like.

For example, a relatively low concentration is used as the tin compound catalyst concentration in order to reduce the residual amount in the product polymer, and the concentration is typically set to at most 0.1 g/mL, more preferably at most 0.05 g/mL, and more preferably approximately 0.001 to 0.02 g/mL.

In addition, a liquid initiator such as dodecyl alcohol dissolvable a tin dichloride catalyst is also used as an organic solvent, and although there is the difficulty that the quantity ratio relative to the catalyst is limited in accordance with the target product polymer molecular weight due to reasons related to the molecular weight adjusting action thereof, there are advantages such as the fact that the process can be simplified so that the residual solvent in the product polymer can be avoided since an additional organic solvent is not used.

That is, although the ring-opening polymerization of the cyclic ester in the production method for an aliphatic polyester according to the present invention could be performed as liquid polymerization, the ring-opening polymerization is preferably performed essentially as bulk polymerization in which practically no solvent is used other than the solvent used secondarily in addition to auxiliary agents such as catalysts from the perspective of the properties of the produced aliphatic polyester, and volume efficiency of the polymerization apparatus. In addition, it is also preferable to recover the polymer in the late stage of polymerization in a solid pulverized state, to further reduce the residual monomers to 0.2 wt. % or less and further to 0.1 wt. % or less by solid phase polymerization, and then to pelletize the substance by melting and kneading the substance together with a thermal stabilizer (an example of such bulk polymerization is disclosed in the specification of WO2007/086563A1).

Preferable examples of thermal stabilizers include phosphoric acid esters having a pentaerythritol skeleton structure such as cyclic neopentane tetrayl bis-(2,6-di-tert-butyl-4-methyl phenyl)phosphite, cyclic neopentane tetrayl bis-(2,4-di-tart-butyl phenyl)phosphite, and cyclic neopentane tetrayl bis-(octadecyl)phosphite; phosphoric acid alkyl esters or phosphorous acid alkyl esters preferably having an alkyl group having from 8 to 24 carbons such as mono- or di-stearic acid phosphate or mixtures thereof; carbonic acid metal salts such as calcium carbonate and strontium carbonate; hydrazine compounds typically known as polymerization catalyst deactivators having —CONHNH—CO— units such as bis [2-(2-hydroxybenzoyl)hydrazine]dodecanoic acid and N,N'-bis[3-(3,5-di-t-butyl-4-hydroxyphenyl)propionyl]hydrazine; triazole compounds such as 3-(N-salicyloyl)amino-1,2,4-triazole; triazine compounds; and the like. The structures of these thermal stabilizers are illustrated in WO2003/037956A1, if necessary. These thermal stabilizers are preferably used at a ratio of 3 parts by weight or less, more preferably 0.003 to 1 part by weight, and most preferably 0.01 to 0.05 parts by weight per 100 parts by weight of the aliphatic polyester.

Furthermore, the water resistance (hydrolysis resistance) of the resulting pellet form aliphatic polyester can be improved by adding a carboxyl group-capping agent in addition to the thermal stabilizer.

A substance known as an agent for improving the water resistance of an aliphatic polyester such as polylactic acid can typically be used as a carboxyl group-capping agent, and examples include carbodiimide compounds including monocarbodiimide and polycarbodiimide compounds such as N,N-2,6-diisopropyl phenyl carbodiimide; oxazoline compounds such as 2,2'-m-phenylene bis(2-oxazoline), 2,2'-p-phenylene bis(2-oxazoline), 2-phenyl-2-oxazoline, and styrene-isopropenyl-2-oxazoline; oxazine compounds such as 2-methoxy-5,6-dihydro-4H-1,3-oxazine; epoxy compounds such as N-glycidyl phthalimide, cyclohexene oxide, and triglycidyl isocyanurate; and the like. Of these, carbodiimide compounds or epoxy compounds are preferable. Two or more types of these carboxyl group-capping agents can be used in combination as necessary, and the carboxyl group-capping agent are preferably blended at a ratio of 0.01 to 10 parts by weight, more preferably 0.1 to 2 parts by weight, and particularly preferably 0.2 to 1 part by weight per 100 parts by weight of the aliphatic polyester.

The aliphatic polyester pulverized product and thermal stabilizer described above, as well as the carboxyl group-capping agent added as necessary, are melted (and mixed) by heating to a temperature range from +5 to +60° C. above the melting point of the aliphatic polyester. For example, when the aliphatic polyester is polyglycolic acid (PGA), the temperature range is preferably from 230 to 280° C. and more preferably from 240 to 270° C. Basically, any melting (and mixing) means can be used, and a stirrer, a continuous kneader, or the like may be used, but it is preferable to melt (and mix) the substances while heating in an extruder (for example, a equi-directionally twin-screw extruder), which enables processing in a short period of time and allows for a smooth transition to the subsequent cooling step.

In order to provide the aliphatic polyester with mechanical strength and other properties, a filler material may be used. The type of the filler material is not particularly limited, but filler materials such as fiber-like, plate-like, powder-like, and granule-like filler materials can be used. Specific examples include fibrous or whisker-like filler materials such as glass fibers, PAN or pitch-type carbon fibers, metal fibers such as stainless steel fibers, aluminum fibers, and brass fibers, natural fibers such as chitin/chitosan, cellulose, and cotton, organic synthetic fibers such as aromatic polyimide fibers, gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminum borate whiskers, and silicon nitride whiskers; natural inorganic minerals such as mica, talc, kaolin, silica, and sand; powder-like, granule-like, or plate-like filler materials of calcium carbonate, glass beads, glass flakes, glass microballoons, clay, molybdenum disulfide, wollastonite, montmorillonite, titanium oxide, zinc oxide, calcium polyphosphate, and graphite. The type of glass fibers is not particularly limited as long as the glass fibers are of a type that is typically used for the reinforcement of resins. For example, the glass fibers can be selected from long-fiber type or short-fiber type chopped strands, milled fibers, and the like. Two or more types of the filler materials described above may also be used in combination. The filler material can also be used after the surface thereof is treated with a known coupling agent (for example, a silane coupling agent, a titanate coupling agent, or the like) or another surface treatment agent. In addition, the glass fibers may be covered or bundled with a thermoplastic resin such as an ethylene/vinyl acetate copolymer or a thermosetting resin such as an epoxy resin. The added amount of the filler material is front 0.1 to 100 parts by weight and particularly preferably from 1 to 50 parts by weight per 100 parts by weight of the aliphatic polyester.

EXAMPLES

The present invention will be described in further detail hereinafter using working examples of producing polyglycolic acid (PGA) and polylactic acid (PLA) as aliphatic polyesters. The physical properties (values) described in this specification, including the following descriptions, are based on measurements taken using the following methods.
(1) Conversion The monomer content in the reaction mixture was measured to calculate the conversion. In order to measure the monomer content, 2 g of dimethyl sulfoxide (DMSO) in which 4-chlorobenzophenone serving as an internal standard was dissolved at a concentration of 0.2 g/L was added to approximately 50 mg of the sample. After this was dissolved by heating for approximately 3 minutes at 160° C., the solution was cooled to room temperature and then filtered. 1 μL of the filtrate was collected and injected into a gas chromatography (GC) device for measurement.
<GC Conditions>

Apparatus: "GC-2010" manufactured by the Shimadzu Corporation

Column: "TC-17", 0.25 mm ɸ×30 m

Column temperature: Retention for 5 minutes at 150° C., heating to 270° C. at 20° C./min, and retention for 3 minutes at 270° C.

Vaporization chamber temperature: 180° C.

Detector: FID (flame ionization detector), temperature: 300° C.
(2) Initial Conversion, Reaction Completion Time, and Reaction Rate Constant The conversion roughly at the time when the reaction product began to demonstrate viscosity (60 minutes for glycolide and 6 hours for L-lactide from the start of polymerization) during the progression of polymerization was defined as the initial conversion. The conversion was measured every 30 minutes from this point, and the time from the start of polymerization when the conversion stopped changing was recorded as the reaction completion time.

On the other hand, in the early stage of polymerization before the reaction product began to demonstrate viscosity, the reaction rate constant $k_p$ (units: "1/s") was found from the following primary formula (1) obtained under the hypothesis that a cessation reaction does not occur and that the number of reaction centers (presumably determined by the numbers of initiator molecules and catalyst molecules) is constant.

$$-d[M]/dt=k_p[M] \qquad (1)$$

More specifically, sampling was performed several times during the period up to 15 minutes for glycolide and up to 60 minutes for L-lactide after the start of the reaction, and −ln ([M]/[M]$_0$) (where [M]$_0$: initial monomer concentration) relative to the reaction time was plotted based on the measured monomer concentration [M]. The (initial) reaction rate constant $k_p$ was found from the slope of this plot.

(3) Molecular Weight:

Approximately 10 mg of the sample was dissolved by heating at 160° C. in 0.5 mL of DMSO and then cooled to room temperature. This solution was diluted to 10 mL with hexafluoroisopropanol (HFIP) and injected into a gel permeation chromatography (GPC) device for molecular measurements. The weight average molecular weight (Mw) and the number average molecular weight (Mn) were found based on the measured molecular weight distribution.

<GPC Conditions>

Apparatus: "Shodex GPC-104" manufactured by Showa Denko K.K.

Column: "HFIP-606M" (2 columns), pre-column: "HFIP-G" (1 column) connected in series Column temperature: 40° C.

Eluent: 5 mM sodium trifluoroacetate/HFIP solution

Flow rate: 0.6 mL/min

Detector: RI (differential refractive index detector)

Reference substance for molecular weight determination: standard methyl polymethacrylate (manufactured by Showa Denko K.K., molecular weight: 1,950,000, 659,000, 218,000, 50,000, 21,000, 7,000, and 2,000).

(4) Thermal Stability:

10 mg of a sample resin was placed in a thermogravimetric analyzer (TGA), and the thermal weight retention rate (%) was calculated and evaluated using the following formula based on changes in weight before and after retention for 60 minutes at 260° C. under a flow of nitrogen at a rate of 40 cc (reference state)/min.

Thermal weight retention rate(%)=
(weight after heating weight before heating)×
100.

In addition, in order to avoid fluctuation in the measurement results due to changes over time after polymerization, sample resins were stored in a low-humidity environment at a temperature of 23±1° C. and a dew point of −50° C. or less after polymerization and then retrieved immediately before the measurements of (3) molecular weight and (4) thermal stability.

Working Example 1

First, 0.015 parts by weight of tin dichloride as a catalyst and 0.1 parts by weight of ethylene glycol as a polymerization initiator were added to a polymerization vessel per 100 parts by weight of a glycolide, and paratoluene sulfonic acid was added as a co-catalyst at a molar ratio of 0.1 with respect to the catalyst. The loaded content was kept under heating conditions at 170° C., and the reaction rate after 60 minutes, the final reaction time, and the (initial) reaction rate constant were found using the methods described above.

The results of the following working examples and comparative examples are illustrated collectively in Table 1 below.

Working Example 2

The operations of Working Example 1 were repeated with the exception of changing the co-catalyst/catalyst molar ratio to 0.5.

Working Example 3

The operations of Working Example 1 were repeated with the exception of changing the co-catalyst/catalyst molar ratio to 1.

Working Example 4

The operations of Working Example 1 were repeated with the exception changing the co-catalyst/catalyst molar ratio to 2.

Reference Example 1

The operations of Working Example 1 were repeated with the exception of changing the co-catalyst/catalyst molar ratio to 5.

Working Example 5

The operations of Working Example 3 were repeated with the exception of using methane sulfonic acid as a co-catalyst.

Working Example 6

The operations of Working Example 3 were repeated with the exception of using 0.0027 parts by weight of tin (II) octanoate as a catalyst.

Comparative Example 1

The operations of Working Example 1 were repeated with the exception that a co-catalyst was not used.

Comparative Example 2

The operations of Working Example 3 were repeated with the exception of using the triphenylphosphine used in Patent Document 9 as a co-catalyst.

Comparative Example 3

The operations of Working Example 6 were repeated with the exception that a co-catalyst was not used.

The results of Working Examples 1 to 6, Reference Example 1, and Comparative Examples 1 to 3 are shown collectively in the following Table 1.

TABLE 1

| | Catalyst | Co-catalyst | Co-catalyst/catalyst molar ratio | Reaction rate constant $(\times 10^{-4})$ s$^{-1}$ | Conversion after 60 minutes (%) | Reaction completion time (h) |
|---|---|---|---|---|---|---|
| Working Example 1 | Tin dichloride | Paratoluene sulfonic acid | 0.1 | *1 | *1 | 5 |
| Working Example 2 | Tin dichloride | Paratoluene sulfonic acid | 0.5 | 8.5 | 92 | 5 |
| Working Example 3 | Tin dichloride | Paratoluene sulfonic acid | 1 | 9.7 | 93.1 | 4.5 |
| Working Example 4 | Tin dichloride | Paratoluene sulfonic acid | 2 | 7.9 | 91.9 | 5 |
| Reference Example 1 | Tin dichloride | Paratoluene sulfonic acid | 5 | *1 | *1 | 6 |
| Working Example 5 | Tin dichloride | Methane sulfonic acid | 1 | 9 | 91.9 | 4.5 |
| Working Example 6 | Tin octanoate | Paratoluene sulfonic acid | 1 | 11.1 | 89.7 | 8 |
| Comparative Example 1 | Tin dichloride | — | — | 6.9 | 90.5 | 5.5 |
| Comparative Example 2 | Tin dichloride | Triphenylphosphine | 1 | 5.5 | 84 | 5.5 |
| Comparative Example 3 | Tin octanoate | — | — | 12.6 | 80.4 | 12 |

*1: not measured

The following can be seen from Table 1. When paratoluene sulfonic acid (aromatic sulfonic acid compound) is added as a co-catalyst in addition to a tin dichloride catalyst, a slight reduction in the reaction completion time is observed, and a co-catalytic effect is observed, even when the co-catalyst/catalyst molar ratio is 0.1 (Working Example 1) in comparison to when a co-catalyst is not used (Comparative Example 1). Furthermore, when the co-catalyst/catalyst molar ratio is increased (Working Examples 2 to 4), a marked co-catalytic effect is observed from the perspectives of the reaction rate constant, the polymerization reaction rate after 60 minutes, and the reaction completion time, but when the co-catalyst/catalyst molar ratio is further increased to 5 (Reference Example 1), the polymerization rate actually decreases in comparison to when a co-catalyst is not used (Comparative Example 1). The co-catalytic effect with respect to the tin dichloride catalyst is also observed with methane sulfonic acid (aliphatic sulfonic acid compound). When paratoluene sulfonic acid is used as a co-catalyst with respect to a tin octanoate catalyst (Working Example 6), the initial reaction rate constant decreases slightly in comparison to when a co-catalyst is not used (Comparative Example 3), but a marked co-catalytic effect is observed beginning from the intermediate stage of the reaction, as can be seen from the increase in the conversion after 60 minutes and the reduction in the reaction completion time.

The following polymerization tests were performed using L-lactide as a monomer instead of a glycolide.

Working Example 7

First, 0.054 parts by weight of tin octanoate as a catalyst and 0.1 parts by weight of ethylene glycol as a polymerization initiator were added to a polymerization vessel per 100 parts by weight of L-lactide, and paratoluene sulfonic acid was added as a co-catalyst at a molar ratio of 1 with respect to the catalyst. Polymerization was advanced while keeping the loaded content under heating conditions at 180° C., and the initial reaction rate constant, the conversion after 6 hours, and the final reaction time were found using the methods described above.

Comparative Example 4

The operations of Working Example 7 were repeated with the exception that a co-catalyst was not used.

The results of Working Example 7 and Comparative Example 4 described above are shown collectively in the following Table 2.

TABLE 2

| | Catalyst | Co-catalyst | Co-catalyst/catalyst molar ratio | Reaction rate constant $(\times 10^{-4})$ s$^{-1}$ | Conversion after 6 hours (%) | Reaction completion time (h) |
|---|---|---|---|---|---|---|
| Working Example 7 | Tin octanoate | Paratoluene sulfonic acid | 1 | 1.1 | 95.3 | 14 |
| Comparative Example 4 | Tin octanoate | — | — | 1.74 | 93.1 | 17 |

Examining Table 2, as same as the case of glycolides (Working Example 6 and Comparative Example 3 in Table 1 described above), even when L-lactide is used as a monomer, although the initial reaction rate constant decreases slightly when paratoluene sulfonic acid is used as a co-catalyst with respect to a tin octanoate catalyst in comparison to when a co-catalyst is not used, a marked co-catalytic effect is observed beginning from the intermediate stage of the reaction, as can be seen from the increase in the conversion after 6 hours and the reduction in the reaction completion time.

(Molecular Weight Measurements and Thermal Stability Tests)

Molecular weight measurements prior to the thermal stability test and thermal stability tests (thermal weight retention rate measurements) were performed with the methods described above for the polymers obtained after the completion of the reactions in Working Example 3 and Comparative Example 1 described above. The results are shown collectively in the following Table 3.

TABLE 3

| | Catalyst | Co-catalyst | Co-catalyst/catalyst molar ratio | Mw (×10$^4$) | Mw/Mn | Thermal weight retention rate (%) |
|---|---|---|---|---|---|---|
| Working Example 3 | Tin dichloride | Paratoluene sulfonic acid | 1 | 20.7 | 1.88 | 82.7 |
| Comparative Example 1 | Tin dichloride | — | — | 20.8 | 1.91 | 80.3 |

In Working Example 3 in which paratoluene sulfonic acid was added as a co-catalyst, a clear difference was observed in the thermal weight retention rate in spite of a lack of a difference in the molecular weights of the polymers obtained after polymerization in a comparison with Comparative Example 1 in which a co-catalyst was not added. A marked thermal stability (thermal weight retention rate) improving effect is thus observed as a result of adding paratoluene sulfonic acid, Reference Example 2

In Working Examples 3 and 5, there was practically no progression of polymerization when only a co-catalyst was used without using tin dichloride.

Reference Example 3

The operations of Comparative Example 1 were repeated without using a co-catalyst and with the exception of using zinc (II) chloride as a catalyst instead of tin dichloride.

Reference Example 4

The operations of Working Example 3 were repeated with the exception of using zinc (II) chloride as a catalyst instead of tin dichloride.

Reference Example 5

The operations of Comparative Example 1 were repeated without using a co-catalyst and with the exception of using zirconium (II) chloride as a catalyst instead of tin dichloride.

Reference Example 6

The operations of Working Example 3 were repeated with the exception of using zirconium (II) chloride as a catalyst instead of tin dichloride.

Reference Example 7

The operations of Comparative Example 1 were repeated without using a co-catalyst and with the exception of using zirconium (II) acetyl acetonate as a catalyst instead of tin dichloride.

Reference Example 8

The operations of Working Example 3 were repeated with the exception of using zirconium (II) acetyl acetonate as a catalyst instead of tin dichloride.

The conversion after 7 hours were measured in Reference Examples 3 to 8 described above. The results of Comparative Examples 1 and 3 are shown collectively in the following Table 4.

TABLE 4

| | Catalyst | Co-catalyst | Co-catalyst/catalyst molar ratio | Conversion after 7 hours (%) |
|---|---|---|---|---|
| Reference Example 3 | Zinc chloride | — | — | 33.1 |
| Reference Example 4 | Zinc chloride | Paratoluene sulfonic acid | 1 | 26.6 |
| Reference Example 5 | Zirconium chloride | — | — | 81.2 |
| Reference Example 6 | Zirconium chloride | Paratoluene sulfonic acid | 1 | 81.9 |
| Reference Example 7 | Zirconium acetyl acetonate | — | — | 90.5 |
| Reference Example 8 | Zirconium acetyl acetonate | Paratoluene sulfonic acid | 1 | 90.9 |
| Comparative Example 1 | Tin dichloride | — | — | 99.8 |
| Comparative Example 3 | Tin octanoate | — | — | 98.7 |

The results shown in Table 4 above indicate that a co-catalytic effect of the sulfonic acid compound is specifically observed with respect to the tin compound catalyst and is not uniformly observed with combinations with other metal compound catalysts known as ring-opening polymerization catalysts of cyclic esters.

INDUSTRIAL APPLICABILITY

As shown by the results of Tables 1 to 3, the present invention provides an efficient method of producing an aliphatic polyester with improved thermal stability by using a sulfonic acid compound as a co-catalyst at the time of the ring-opening bulk polymerization of a cyclic ester using a tin compound catalyst.

The invention claimed is:

1. A method of producing an aliphatic polyester comprising:
   a step of subjecting a cyclic ester to ring-opening polymerization to produce an aliphatic polyester, the ring-opening, polymerization being performed in a co-presence of
   a tin compound serving as a catalyst,
   a polymerization initiator, and
   a sulfonic acid compound serving as a co-catalyst.

2. The method of producing an aliphatic polyester according to claim 1, wherein
   the tin compound is at least one of tin dichloride and tin octanoate.

3. The method of producing an aliphatic polyester according to claim 1, wherein
   the polymerization initiator is an alcohol.

4. The method of producing an aliphatic polyester according to claim 1, wherein
   the sulfonic acid compound is methane sulfonic acid or paratoluene sulfonic acid.

5. The method of producing an aliphatic polyester according to claim 1, wherein
   the cyclic ester is at least one of glycolide and lactide.

6. The method of producing an aliphatic polyester according to claim 1, wherein
   the tin compound is used at a ratio of 1-100 ppm by weight with respect to the cyclic ester, and
   the sulfonic acid compound is used at a ratio of 0.1-3 mols per 1 mol of the tin compound.

7. The method of producing an aliphatic polyester according to claim 1, wherein
   the cyclic ester is free of a side vinyl group, and
   the aliphatic polyester is free of a side functional group.

8. The method of producing an aliphatic polyester according to claim 1, wherein
   the cyclic ester is a cyclic dimer of an $\alpha$-hydroxycarboxylic acid, and
   the aliphatic polyester is free of a side functional group.

* * * * *